(12) United States Patent
Jachiet

(10) Patent No.: US 9,092,326 B2
(45) Date of Patent: Jul. 28, 2015

(54) METHOD OF CREATING A VIRTUAL ADDRESS FOR A DAUGHTER SOFTWARE ENTITY RELATED TO THE CONTEXT OF A MOTHER SOFTWARE ENTITY

(75) Inventor: Frédéric Jachiet, Montreux (CH)

(73) Assignee: ALVEOL TECHNOLOGY SARL, Attalens (CH)

( * ) Notice: Subject to any disclaimer, the term of this patent is extended or adjusted under 35 U.S.C. 154(b) by 1333 days.

(21) Appl. No.: 13/138,802

(22) PCT Filed: Apr. 3, 2009

(86) PCT No.: PCT/FR2009/050574
§ 371 (c)(1),
(2), (4) Date: Jan. 3, 2012

(87) PCT Pub. No.: WO2009/136043
PCT Pub. Date: Nov. 12, 2009

(65) Prior Publication Data
US 2012/0110301 A1    May 3, 2012

(30) Foreign Application Priority Data

Apr. 3, 2008  (FR) ...................... 08 52231

(51) Int. Cl.
| G06F 13/00 | (2006.01) |
|---|---|
| G06F 13/28 | (2006.01) |
| G06F 12/02 | (2006.01) |
| G06F 12/10 | (2006.01) |
| G06F 12/14 | (2006.01) |
| G06F 11/36 | (2006.01) |

(52) U.S. Cl.
CPC ............ *G06F 12/0284* (2013.01); *G06F 12/10* (2013.01); *G06F 12/145* (2013.01); *G06F 11/3636* (2013.01); *Y02B 60/1225* (2013.01)

(58) Field of Classification Search
CPC .. G06F 11/3636; G06F 12/0284; G06F 12/10
USPC .................................. 711/203, 220, E12.002
See application file for complete search history.

(56) References Cited

U.S. PATENT DOCUMENTS

| 4,758,946 | A |   | 7/1988 | Shar et al. |   |
|---|---|---|---|---|---|
| 5,887,190 | A | * | 3/1999 | Priem et al. | ........................ 710/3 |
| 5,956,751 | A |   | 9/1999 | Lai |   |
| 2006/0236074 | A1 | * | 10/2006 | Williamson et al. | ........... 711/216 |
| 2010/0100702 | A1 | * | 4/2010 | Doi | ............................... 711/207 |

(Continued)

OTHER PUBLICATIONS

Jacob B, et al., "Virtual Memory in Contemporary Microprocessors", IEEE MICRO, IEEE Service Center, Los Alamitos, CA, US LNKD-DOI: 10.1109/40.710872, vol. 18, No. 4, Jul. 1, 1998, pp. 60-75, XP000786716 ISSN: 0272-1732.

(Continued)

*Primary Examiner* — Edward Dudek, Jr.
(74) *Attorney, Agent, or Firm* — McGinn IP Law Group, PLLC

(57) ABSTRACT

A process for creates a virtual address for a software entity called a "daughter" belonging to the context of a software entity called the "mother." This virtual address includes a series of fields allowing retrieval of the series of fields of the virtual address of the mother software entity and a field unique in the context of the mother software entity. Each series of fields is associated with a single software entity which it defines completely.

20 Claims, 5 Drawing Sheets

(56) References Cited

U.S. PATENT DOCUMENTS

2011/0264867 A1* 10/2011 Wan et al. ............... 711/147
2012/0173926 A1* 7/2012 Abou-Emara et al. ........ 714/25
2013/0212314 A1* 8/2013 Brandt et al. .............. 711/6
2014/0181463 A1* 6/2014 Greiner et al. ............. 711/207

OTHER PUBLICATIONS

International Search Report (ISR) (PCT Form PCT/ISA/210) dated Jul. 5, 2010.

* cited by examiner

METHOD OF CREATING A VIRTUAL ADDRESS FOR A DAUGHTER SOFTWARE ENTITY RELATED TO THE CONTEXT OF A MOTHER SOFTWARE ENTITY

FIELD OF THE INVENTION

The invention is directed to managing the memory of computer systems. More specifically, a virtual address created for a daughter software entity includes a series of fields that completely define the software entity.

BACKGROUND OF THE INVENTION

In known fashion, a computer system executes instructions, which are commonly called software, code or a computer program while these instructions manipulate data stored in memory. These data can for example be variables, pointers, tables, unions or structures. The memory of the computer system contains both data and code at the same time.

Between the processor and the memory of the computer system, a memory management unit, called an MMU, is often incorporated (especially in multitasking systems), which carries out address translation between a virtual address handled by the processor and a physical address in memory.

In known fashion, a virtual address is also sometimes called a "logical address."

Document U.S. Pat. No. 5,956,751 describes a memory management mechanism. FIG. 2 of this document illustrates perfectly the conventional segmenting and paging mechanisms, particularly used in the 'x86' processors.

It is recalled in particular that the memory used by a program can be cut up into segments such as for example a segment of initialized data, a non-initialized data segment, and a code segment.

In addition to this segmentation mechanism, an MMU breaks memory up into pages of fixed or predefined size (often a multiple of a certain size). An indirection mechanism makes a page correspond to a virtual address.

For any memory request, an MMU determines which segment is considered, then determines (most often by means of a mapping table) which page is addressed. Finally, the MMU adds an offset, within the address page, to select the correct memory address.

Such a memory management mechanism poses a certain number of problems due to the very structure of the logical address.

As stated previously, the logical address is made up of a page field, a segment field and an offset field.

These fields do not in any way reflect the architecture of the computer program; in particular, a function can be split among several pages, or a page can contain several functions, at least in part.

It is therefore understood that if an error occurs at the time of execution of a given address, it is excessively difficult to identify the faulty code segment.

To resolve this problem, it is known to use debugging tools capable of recording an execution trace of the program. To be effective, these debuggers must include a large trace memory, an expensive solution. In addition, the analysis of these traces is complicated.

One solution for limiting the risk of error or facilitating debugging consists of statically defining all virtual addresses during compilation.

The person skilled in the art will understand that this solution cannot be considered in a complex environment, wherein it is not known a priori what applications will be executing, which libraries will be in use and what volume of data will be handled by the instance of an application.

SUMMARY OF THE INVENTION

In one exemplary aspect, the invention aims to resolve the aforementioned drawbacks by a proposing a logical address creation mechanism allowing debugging that is extremely easy and readable even in a very complex environment.

More precisely, in an exemplary embodiment, the invention relates to a method for creating a virtual address for a software entity called a "daughter" belonging to the context of a software entity called the "mother," that virtual address comprising a series of fields allowing retrieval of the series of fields of the mother software entity and a field unique in the context of the mother software entity, and wherein each series of fields is associated with a single software entity in the computer system which it defines completely.

Correlatively, in another exemplary aspect, the invention relates to a code generating tool including means for creating a virtual address for a so-called "daughter" software entity belonging to the context of a so-called "mother" software entity, said virtual address comprising a series of fields allowing retrieval of the series of fields of the virtual address of the mother software entity and a field unique in the context of the mother software entity, and wherein each series of fields is associated with a single software entity which it defines completely.

In this document, a "series of fields" consists of one or more fields.

In this document, the term "software entity" will refer to any computer object identified and named in the source code of the software program, such as for example an operating system, an application group, an application, a process, a thread, a class, a method, a function, a library, a table, a variable, a constant, a pointer, a structure or a union.

It can be noted that a computer system implicitly defines a hierarchy between the different software entities: an operating system contains one or more application groups, each of which comprises one or more applications. An application can be divided into processes, which in turn can comprise one or more threads. These threads can contain one or more of the classes, which in turn can contain one or more methods. A method can call one or more functions.

This hierarchy defines a concept of descent or inheritance: a software entity A, comprising one or more software entities B, will be seen as the mother of these software entities B. Thus the mother software entity of a method is a class. Reciprocally, this method can be considered the daughter software entity of the class to which it belongs.

Likewise, the mother software entity of a mother software entity is a grandmother software entity and the daughter software entity of a daughter software entity is a granddaughter software entity.

In this document, it will be stated equivalently that the mother software entity is the context of the daughter software entity. By way of example, in the C language, the context of a variable local to a function is that function and the context of a global variable is the main( ) function. In object-oriented language, the context of a method is its class.

This invention makes it possible to determine precisely and directly, in the event of a runtime error, the software entity that is at fault, and to go up into the exact context of that faulty software entity thanks to the "mother-daughter" mechanism, solely by analyzing a logical address. It is thus possible to detect an error in a software entity even if the source code is not known.

The invention applies perfectly to a complex environment wherein virtual addresses are defined dynamically.

In a particularly simple mode of implementation of the invention, a virtual address can be represented in the form of a table of fields.

As an exemplary variation, any other method allowing retrieval of the logical address of the mother software entity from that of the daughter can be used.

Thus, one exemplary variation of the invention includes using a mathematical function allowing the logical address of the mother software entity and the additional daughter field unique to the context of the mother to be obtained from the logical address of the daughter software entity.

In one particular exemplary embodiment of the address creation method according to the invention, the rights of a first software entity for accessing a second software entity,are determined by comparing at least one field of the logical address of the first software entity with at least one field of the logical address of the second software entity.

This advantageously allows very precise monitoring of access rights within the computer system, as it is possible to associate rights directly and independently with each software entity.

In particular, when a variable is accessed by several functions, the invention allows different access rights to that variable to be defined for each of those functions (read only, write only, execute or read/write).

Likewise, the invention can make it possible to authorize a call to a library by a first function and to prohibit a call to the same library by another function.

The logical address format proposed by the invention also allows the definition of default access rights to a software entity according to its level in the "mother-daughter" hierarchy. The invention particularly allows the isolation of a thread by prohibiting any visibility in memory of the other threads of the same father process. A conventional system offers this possibility at the process level, but not for threads.

In prior art mechanisms, it is very difficult to identify which function is executing or which variable is accessed from its virtual address.

To define access rights in conventional systems, it is known to use segments wherein variables having the same rights are grouped together. These segments can be of small size as necessary. But this mechanism is not satisfactory because a call between segments invokes the operating system.

The invention resolves this problem by defining rights at the level of each software entity.

This constitutes a major advantage of this invention. By relying on these software entity and field concepts, it is possible to define application groups on a computer system: each application group will be identified by the index of its "application group" field.

It is then very easy to identify to which application group a software entity belongs by means of its "application group" index. By prohibiting any access between software entities having different "application group" field indexes, using specific access rights parameterized on the MMU, the computer system totally isolates the application groups from one another. These application groups are executed on the same computer system and share the same memory, but they are completely compartmentalized with respect to one another.

The aim of existing virtualization systems is to offer the same functionality, to wit, sealing off different application groups executing on the same computer system.

But existing virtualized systems execute each virtualized instance on a different operating system, whereas this invention allows virtualization of these application groups within a single operating system.

Similarly, the computer system can download an unauthenticated executable and execute this software having conferred very restricted access rights on it by parameterization in the MMU. Typically, this software will have rights for exchanging with the audio library for playing music but will not be able to access the files on the hard drive. If this software contains a virus, these restricted access rights limit the possibilities of damage to the computer system.

In a particular embodiment, the virtual address creation process according to the invention includes a step for assigning to a daughter software entity belonging to the context of at least two mother software entities an address that is virtual to the daughter software entity for each of these contexts.

Thus, two mother software entities can access the same daughter software entity. For example, when the mothers are functions and the daughter a variable, the invention allow these functions to share this variable.

The invention thus makes it possible to easily create a shared memory which will be readable only by the two mother software entities, without writing-back data.

This operation can be carried out by the MMU without invoking the operating system.

It can be argued that a logical address according to the invention requires a large amount of information to designate a software entity and a relatively large memory footprint for addressing a software entity.

Nevertheless, the person skilled in the art knows that a function often manipulates its own local variables.

In one particular exemplary embodiment of the invention, the virtual address of a local variable can explicitly repeat the logical address of its mother function during runtime. In this embodiment, the first fields of the virtual address of the variable are therefore identical to those of the virtual address of the code being executed.

In order to compress the virtual addresses, the invention proposes an embodiment wherein a virtual address includes supplementary information containing the number of first fields that are identical to a reference virtual address, for example the virtual address of the function that is being executed.

Consequently, the virtual address creation process according to a particular embodiment proposes to use a virtual address including at least one supplementary datum specifying the fields that are identical to those of a virtual address of a reference software entity.

In a particular exemplary embodiment of the invention, information imposing a time limit on access to a software entity is associated with the logical address of that software entity.

In known fashion, a computer system can contain music or films to which access rights are assigned. But the invention makes it possible to improve the management of rights by defining by way of the MMU a time limit for access to a software entity.

Thus, a software entity storing a music file lasting 3 minutes will be accessible for reading for 3 minutes only from the time of the first reading, which allows one and only one reading of this file. The user can decide at any time when he wants to begin playing his file but his rights expire as soon as the reading is finished.

In the case of access to a software entity outside the authorized time span, the MMU, for example, can return an error signal.

This mechanism avoids invoking the operating system as is usual in prior art, where it is known for the operating system to allocate a maximum run time to a process.

According to a second exemplary aspect, the invention also relates to a process for executing a computer program including a step consisting of allocating a range of addresses in the physical memory of a computer system in association with the virtual address of a software entity including a field that is unique in a context, and a series of fields allowing retrieval of the series of fields of the virtual address of a mother software entity defining that context, and wherein each series of fields is associated with a single software entity which it defines completely.

Correlatively, the invention also applies to a computer system including means for allocating a range of addresses in the physical memory of a computer system in association with the virtual address of a software entity including a field that is unique in a context, and a series of fields allowing retrieval of the series of fields of the virtual address of a mother software entity defining said context, and wherein each series of fields is associated with a single software entity which it defines completely.

The mapping of the range of addresses into the logical address fields of a software entity has numerous advantages over prior art for dynamically detecting a runtime error in software.

Typically, according to prior art, a buffer overflow when write-accessing a table outside the range of addresses allocated to that table.

The invention allows the MMU for example to check that access to a software entity, a table for example, occurs within the address range allocated to that entity. Consequently, any attempted access outside the ranges allocated to that software entity can be blocked by the MMU which will return an error signal.

In a particular exemplary embodiment, the runtime process according to the invention includes a step during which a software entity is shifted in memory, said entity remaining identified by the same logical address before and after shifting.

According to prior art, during runtime, a table is allocated by the operating system a range of addresses which will be referenced by at least one pointer. It is then impossible to shift this table in memory without also changing all the pointers referring to this table.

The person skilled in the art will recognize that this is an excessively complex, perhaps even impossible task in a traditional system, because there is no means for listing these pointers, particularly when the pointers are stored in the stack.

The use of a series of fields for addressing a software entity allows this limitation to be bypassed: a software entity can be shifted in memory by the MMU while still remaining addressed by the same series of fields. To reflect this shift, the MMU changes the upper and lower bounds delimiting this software entity in memory. The shifting operation remains totally transparent for the software or the operating system, which refers only to virtual addresses.

This method therefore allows memory to be defragmented, but unlike the prior art, this defragmentation can be completely performed by the MMU without intervention by the operating system.

In a particular exemplary embodiment, the memory of the computer system is dynamically divided into two parts, the software entities used by the computer system being shifted so as to be grouped into the first part of the memory while the second part of the memory is temporarily unused.

The invention allows, in one exemplary particular embodiment, effective management of the power supply to memory pages thus freed. In a particular exemplary embodiment, this operation is managed by the MMU. It can send frequently to physical memory the address of the range of physical memory which must be supplied with power, which allows a reduction of the power consumption of the memory.

In very advantageous fashion, this shifting can be managed by the MMU.

The invention also allows shifting of an operating system, which in practice is extremely difficult, perhaps even impossible with current memory management mechanisms.

Furthermore, inasmuch as software entities are frequently shifted in memory, it is very difficult to spy on data transfers between the memory and the processor, which strongly secures the computer system, a single memory address containing successively the content of different software entities.

In one particular exemplary embodiment, the runtime process according to the invention associates the type of a software entity with the logical address of that software entity, the type of that software entity and its size in memory being dynamically modifiable during runtime.

In general, this feature makes it possible to avoid overflow problems known in traditional computer systems under the name of "buffer overflow."

In a particular exemplary embodiment of the runtime process according to the invention, a maximum quantity of memory that can be allocated to it is associated with the logical address of a software entity, and during each allocation of memory to that software entity it is verified that this maximum quantity is not exceeded.

Advantageously, this function can be assigned to the MMU without having the operating system intervene as in conventional computer systems.

In a particular exemplary embodiment, the runtime process of a computer program according to the invention [ . . . ] that it includes, as soon as an access to this software entity occurs, a step consisting of loading, into a cache memory, only content from at least part of the range of addresses allocated to a software entity.

In a conventional computer system, it is possible to load in advance into cache memory the content of the memory addresses adjacent to the address that is accessed. However, it is impossible to determine whether these adjacent addresses belong to the software entity being executed or rather to another software entity. To load the code of another function, for example, is useless. This invention makes it possible to limit loading into cache memory to only the content of the software entity.

Conversely, in a particular exemplary embodiment, the runtime process of a computer program according to the invention comprises, as soon as a software entity ceases to be executed, a step consisting of advance unloading of the content in cache memory of this software entity and of its daughter entities.

Typically, when switching from a first process to a second process, the invention makes it possible to purge from cache memory the software entities of the first process and thus to leave the cache memory free for the software entities of the second process. The person skilled in the art will recognize that this process is advantageous because the write-back of the cached data of the first process is carried out in advance.

BRIEF DESCRIPTION OF DRAWINGS

Other features and advantages of the present invention will appear from the description given below, with reference to the drawings and to the annexes which illustrate an embodiment of it that is entirely without limitation. In the figures.

Figure 1:
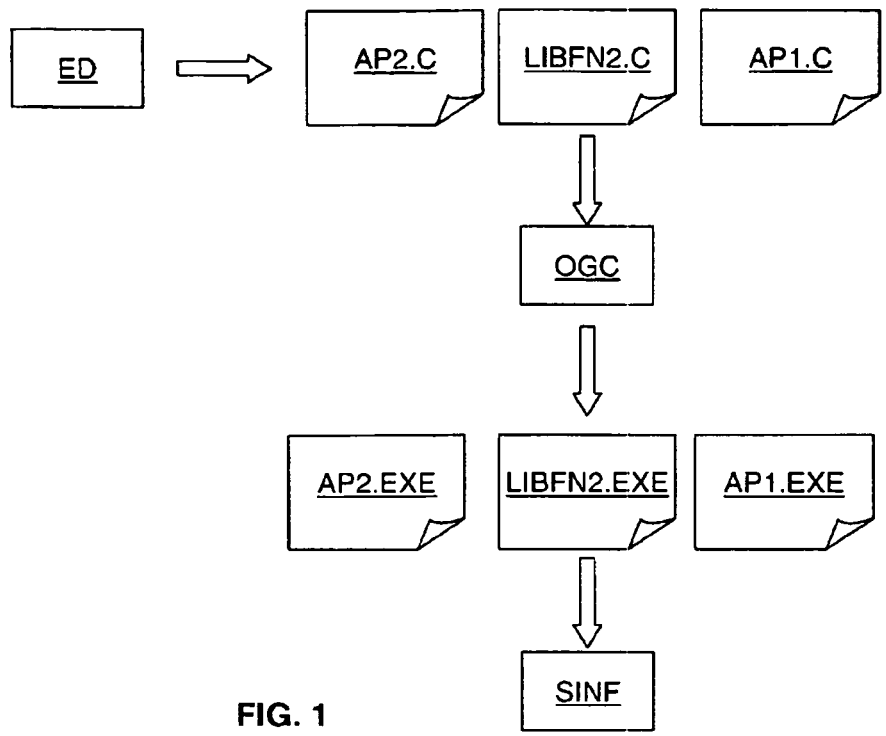
FIG. 1 shows a code generating tool and a computer system conforming to a particular exemplary embodiment of the invention.

Annex 1 is a source code allowing the operation of the invention to be illustrated; and Annex 2 is a file including functions generated by the code generating tool of FIG. 1.

Annexes 3 through 8 are examples of files generated by the code generating tool of FIG. 1.

Detailed Description Of Exemplary Embodiments

We will describe the invention with reference to a software code example written in the C programming language and provided in Annex 1. In this example, we will consider that the software code is split into three files AP1.C, AP2.C and LIB FN2.C.

As in known fashion, these source files will be compiled in order to generate an executable, respectively AP1.EXE, AP2.EXE and LIB FN2.EXE.

In this example, the source file AP1.C includes a main program MAIN( ) (Line 100) and a certain number of instructions with reference L101.

We will consider in this example that the source file LIBFN2.C is a library that includes a single function FN2.

In the example described here, the function FN2 has two input parameters, to wit, a short integer VG and a pointer to a long integer PTR.

In this function there is also declared, in line L33, a local variable TMP3. The person skilled in the art will then recognize in line L34 and L35 two instructions for allocating two address ranges, the size of these address ranges being defined by the first parameter of the function.

Line L36 of this function FN2 frees the memory allocated in line L34.

Finally, this function includes a final instruction, in line L37, allowing the value 100000 to be written to the memory location pointed to by the second parameter of function FN2.

In very advantageous fashion, the function FN2 includes, at line L32, an instruction interpretable by a compiler and which is intended to limit to 10 bytes the quantity of memory that can be allocated by this function.

In the example described here, the source file AP2.C includes firstly a main program MAIN( ) and a certain number of functions FN1, FN3, lecture_PWD and écriture_PWD.

In will be noted in particular that the main program MAIN( ) includes, in line L7, an instruction, interpretable by the compiler, for defining the access rights to a software entity consisting in this example of a table of six characters called PWD.

More precisely, this instruction defines that this variable can be accessed for reading only ("read-only" or RO) by the function lecture_PWD and for writing only ("write-only" or WO) by the function écriture_PWD.

The person skilled in the art will recognize that lines L3 through L6 allow definition of the variables RES, VG1, VG2, PWD and PWD_USER global to the function MAIN( ), that is visible within the meaning of the C language by the functions FN1, FN3, écriture_PWD and lecture_PWD called by this function MAIN( ).

Lines L8 through L11 include calls to these different functions. In the example described here, the function FN1 includes in notable fashion, in line L15, a specific instruction interpretable by the code generating tool for defining the access rights to a long integer "timeout" declared and initialized in line L14. More precisely, this instruction associates with the software entity including this variable a maximum time duration during which this variable can be accessed. In the example described here, this duration is counted beginning with the first access to this variable in reading or in writing.

It is remarkable to note that line L16 includes an instruction which, in a conventional environment, generates a runtime error known to the person skilled in the art by the term integer overflow. Indeed, in the embodiment described here, long integers (of type INT) are encoded in 16 bits. However, the result of the multiplication of the variable X (initialized at 11) by the variable timeout (initialized at 20,000) produces a result equal to 220,000, a value which cannot be encoded in the 16 bits reserved for this variable X.

It will be demonstrated later that the invention allows this problem to be resolved. In the example described here, the function FN3 includes a loop in lines L21 and L22 which makes it possible to initialize the first elements of this table with a short integer, the value whereof varies with each iteration of this loop.

In the example described here, this table includes 10 elements (L18).

The person skilled in the art will understand that inasmuch as the variable is greater than 10, the loop L21 to L22 creates, at runtime, an error known under the name of buffer overflow.

Which consequently causes overwriting of the variable overflow which is in this example located adjacent in memory to the "table" table.

It will be demonstrated later that the invention allows these problems to be detected and the overwriting of the variable overflow to be prevented. It will also be noted that the function FN3 includes, at line L23, a call to the function FN2 of the library LIBFN2.C already described.

In the example described here:
the function écriture_PWD initializes the global variable PWD defined in line L6 of the function MAIN, with a value PWD_USER passed as a parameter of this function; and
the function lecture_PWD checks whether the global variable PWD is equal to the parameter of this function.

FIG. 1 shows a software code generating tool and a computer system conforming to the invention, in their environment. In this figure, there is shown a software code editor ED which can be used, as in known fashion, for editing the source files described previously with reference to Annex 1. As in known fashion, the code generating tool OGC allows compilation of the source files AP2.C and LIB FN2.C to generate the executables AP2.EXE and LIB FN2.EXE executable by the computer system SINF.

Figure 2:
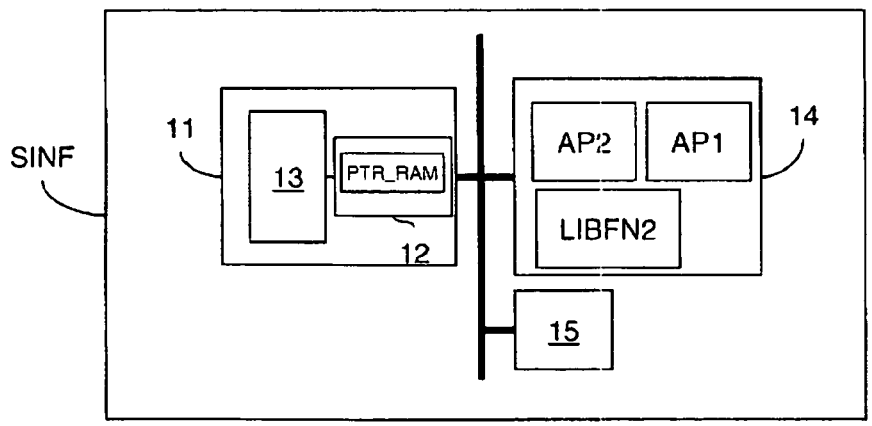
FIG. 2 shows the physical architecture of the computer system of FIG. 1.

In the example described here, the computer system SINF, conforming to the invention, has the conventional architecture of a computer, this architecture being shown in FIG. 2.

More precisely, this system includes a processor 11 incorporating a memory management unit or MMU, with reference number 12, and a read-write memory 13 associated with the MMU 12, a ROM type read-only memory 14 in which are located the different executables and a RAM type read-write memory 15.

It is noted that, although the exemplary embodiments are explained herein as implemented on a computer, one of ordinary skill in the art would recognize that the present invention can be implemented on any computer-like apparatus having an appropriate processor and memory devices that support the processing described herein.

Additionally, it is noted that the program of instructions to implement the present invention could be stored on a number of computer-readable memory devices and storage media. For example, during actual execution, the program instructions would reside in a RAM memory device. When not being actually executed, the program instructions would reside in memory such as a ROM memory device, so as to be selectively executable. Alternatively, the program instructions might be remotely stored on a memory device of a server available through a network, or might be stored in a standalone storage device such as an optical disk or other suitable non-transitory memory device capable of tangibly embodying a program of machine-readable instructions and suitable for insertion into an input device on a computer, for loading the machine-readable instructions onto a memory device within the computer, as is well known in the art.

Figure 3:
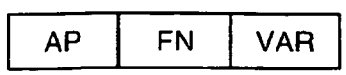
FIG. 3 exemplarily shows an example of a logical address conforming to the invention.

FIG. 3 describes the format of the virtual addresses used in this particular embodiment of the invention.

In the example described here, a virtual address includes a certain number of fields, to wit:
- a field AP for an application;
- two fields AP and FN for a function; and
- three fields AP, FN and VAR for a variable.

In the example described here, the source codes described with reference to Annex 1 describe three applications, to wit:
- the executable AP1.EXE,
- the executable AP2.EXE; and
- the library LIB FN2.EXE.

The application AP2.EXE is the mother software entity of the function the code whereof is included in the executable AP2.EXE. It is therefore the context of the functions MAIN( ) FN1, FN3, écriture_PWD and lecture_PWD.

In conformity with the invention, the virtual address of each of these functions therefore includes the virtual address of the application AP2.EXE. In the embodiment described here, the convention is followed of using the index 0 for the function field (FN) of the function MAIN.

This function MAIN is the context of all the global variables declared in the function MAIN. In the example described here, the function MAIN is therefore the context of the variables RES, VG1, VG2, PWD and PWD_USER. In order to correctly illustrate the virtual address format used in the invention, it can be noted at the outset, as will be demonstrated later, that in the example described here:
- the application AP2.EXE has the virtual address: 3;
- the function MAIN has the virtual address: 3.0;
- the function F1 has the virtual address 3.1;
- and the variable RES has the virtual address 3.0.1.

It is noted that in conformity with the invention the virtual address of a daughter software entity (the variable RES for example) belonging to the context of a mother software entity (to wit, the function MAIN) includes:
- a series of fields "3.0" corresponding to the virtual address of the mother software entity; and
- a field "1" unique in the context of this mother software entity.

Further, it is fundamental to note that each series of fields is associated with a single software entity in the computer system.

Thus for example, the series of fields 3.0 corresponds to the software entity of the program MAIN( ) called AP2.C.

It is also fundamental to note that each series of fields completely defines a software entity. In particular, the series of fields "3" completely defines the application AP2.EXE.

The person skilled in the art will understand that in the example of FIG. 3, for the sake of simplification, we have limited ourselves to three field levels (application AP, function FN, variable VAR), but more could be used.

As a variation, a virtual address can contain fields for other software entity levels and for example for operating systems, application groups, processes, threads, classes, methods, . . .

Referring to Annex 2, we will now describe a certain number of functions that are generated by the compiler to allow implementation of the invention.

In this example:
- a function ATTRIB_IDX_DYN assigns dynamically, to a daughter software entity, an index in a field of depth "prof" (AP, FN, VAR), this index being unique in the context of its mother software entity. This function returns the assigned index;
- a function ATTRIB_IDX_STAT assigns a virtual address to a software entity. This function returns a value representing the success or failure of this operation;
- a function MAP redirects all access to a first virtual address toward a second virtual address;
- a function UNMAP cancels this redirection;
- a function ATTRIB_MEM assigns to a virtual code address a range of physical addresses in the read-write memory of the computer system SINF;
- a function ATTRIB_MEM_EXEC assigns to a virtual data address a range of physical addresses in the read-write memory of the computer systems SINF during execution of the program. This function has two parameters, the virtual address and the size to be allocated, and possibly a third parameter containing the size of an element of the software entity;
- a function MALLOC_MAX defines the maximum size of the physical memory that can be allocated by a software entity;
- a function ATTRIB_DROITS defines rights for a software entity; and
- a function GET_INDEX supplies one or more indexes of the fields of a software entity.

Annex 3 shows the content of the executable LIBFN:EXE obtained by compilation of the file LIBFN2.C by the code generating tool OGC. In the implementation example described here, such an executable file comprises two main parts, to wit:
- a HEADER part used during the loading of the executable into the memory of the computer system; and
- a CODE part used at runtime.

In the example described here, the compilation of line L31 generates four instructions, IN31 through IN34.

More precisely IN31 is an instruction that allows the MMU 12 to be asked to dynamically allocate an index to the application field AP to the function FN2. The value of this field returned by the MMU is denoted Y.

The instruction IN33 is an instruction which allows the virtual address Y.0 to be assigned to the function FN2. It will be noted that this virtual address repeats the fields of the application LIBFN2.

The instruction IN33 allows a virtual address Y.0.1 to be assigned to the first parameter VG of function FN2.

The instruction IN34 allows a virtual address Y.0.2 to be assigned to the second parameter of the function FN2.

Likewise, the header of the executable includes three instructions IN35 through IN37 to assign virtual addresses to the variables TMP3, PTR1 and PTR2.

The header then includes an instruction IN38 for asking the MMU 12 to assign 100 bytes of memory to the code of the function FN2 designated by the virtual address Y.0. The person skilled in the art will understand that this value of 100 bytes corresponds to the necessary memory size for loading the instructions of the CODE part of this executable.

The fact of being able to manage the allocation of memory at the level of the MMU is an important advantage offered by the invention, because in known systems this function is performed by the operating system.

Thanks to the invention, software including the operating system know only the virtual addresses of the memory, but not the physical addresses.

In prior art, an effort is made to isolate the memory used by the different processes to protect against memory corruption problems. The result is a severe complication of the exchange of data between the different processes, the operating system being called upon.

This invention allows simplification of the exchange of data between different software entities, solely due to the MMU.

In addition, thanks to the invention, the memory footprint assigned to a software entity is sized with a granularity as fine as the granularity addressed by the computer system, typically one byte on an "x86" system.

A traditional computer system using paging allocates memory with a granularity of one page, but the size of this page does not necessarily correspond to the size in memory of a software entity: the size of the allocated page is greater than the size in memory of the software entity and this excess memory allocation is not used by the computer system.

Returning to Annex 3, the HEADER includes finally an instruction IN39 for asking a loading unit to load into the memory of the computer system SINF the CODE of the application FN2. In this example, the loading tool is a tool denoted LOAD (loader) and included in the operating system of the computer system.

The CODE part, 100 bytes in size, comprises the CODE of the function FN2.

In this example, the CODE part includes an instruction IN40 for asking the MMU 12, at runtime, to allocate two bytes for the variable with the virtual address Y.0.3, to wit, the variable TMP3 declared in line L33. Likewise, the instructions IN41 and IN42 make it possible to allocate to the pointers PTR1 and PTR2 with virtual addresses Y.0.4 and Y.0.5 a range of addresses the size whereof is defined by the variable with virtual addresses Y.0.1, the first parameter of the function FN2.

In the example described here, the CODE part includes a first instruction IN50, the result of the interpretation by the code generation tool OGC of line L32, and which allows the MMU to be asked to check that a maximum of 10 bytes is allocated for this function FN2.

In the example described here, given that the value of the first parameter of the function FN2 is the variable VG2 initialized at 5, the number of bytes allocated by this portion of CODE, in the instructions IN40 and IN42, is equal to 12, a value greater than the maximum authorized size of 10 bytes. It will be demonstrated later that this triggers an error signal at runtime. The code of this executable then includes an instruction IN43 to free the memory associated with the pointer PTR1 with virtual addresses Y.0.4. The code then includes an instruction IN44 to write the result of the multiplication of X.1.1 by X.1.2 into Y.0.2.

With reference to Annex 4, we will now describe the result of the compilation of the function FN1.

Here are repeated the two parts HEADER and CODE already described with reference to Annex 3.

In this annex, the index X is the index of the application field corresponding to the executable AP2.EXE. In this example, the header part includes three instructions IN60, IN61 and IN62 for allocating virtual addresses respectively to the code of the function FN1 and to the variables x and timeout.

The instructions IN63 and IN64 allow 100 bytes of memory to be allocated for the CODE of the function FN1 and to load this CODE into memory.

The CODE part includes an instruction IN65 for allocating two bytes to the variable X with virtual address X.1.1.

It will be noted that the CODE part includes an instruction IN651 which specifies that the variable x, with virtual address X.1.1, is of type INT, which defines not only its size (16 bits) but also its type (signed, unsigned, . . . ).

Consequently, if during execution a request to write, in the variable x, a value incompatible with its type, can be detected by the MMU, it being able for instance to generate an error signal. The MMU can possibly dynamically modify the type of this variable, for example extending its type to "long" in order to store a value in 32 bits.

The CODE part includes an instruction IN66 for allocating two bytes to the variable timeout with virtual address X.1.2.

The CODE part includes an instruction IN67 resulting from the compilation of line L15 of the CODE of the function FN1. This instruction allows the MMU 12 to be asked to check that the variable TIMEOUT with virtual addresses X.1.2 can only be accessed for the duration of one second starting from the first access to this variable, either in reading or in writing.

The code contains a final instruction IN68 for initializing the variable timeout with virtual addresses X.1.2 with the value 20,000.

Annex 5 describes the result of the compilation of the function lecture_PWD from the file AP2.C.

It is notable, in this file, that the index X of the application field of the executable AP2.EXE appears again because this function lecture_PWD is in the same context as the function FN1 already described.

Instructions IN70 through IN74 of the header part are similar to those described previously in Annex 4. They allow the allocation of virtual addresses to the function lecture_PWD, with parameters PWD_USER and with the return value of this function, and to allocate 50 bytes of memory for the CODE of this function and to load the function into memory.

The CODE part includes an instruction IN75 for comparing the parameter PWD_USER with logical address X.4.1 to the global variable PWD of the main program MAIN( ) the obtaining of the logical address X.0.4 of this variable having been described earlier with reference to Annex 8.

Annex 6, resulting from the compilation of the function écriture_PWD, is obtained in the same manner.

Annex 7 describes the result of the compilation of the function FN3 from the source file AP2.C.

Repeated there is a HEADER part which includes instructions for allocating virtual addresses to the CODE of the function 3 and to each of the variables a, b, table, overflow, i declared in lines L17 through L20.

It will simply be noted that the index of the function field FN assigned to the function FN3 is the index 2.

The CODE part includes an instruction IN80 that is notable in that it makes it possible to declare explicitly to the MMU 12 that the "table" table with virtual address X.2.3 consists of 10 elements each occupying 1 byte.

The following instructions IN80 and IN82 are of the same type as those described previously and allow two bytes to be allocated to the variables overflow and i respectively.

It is recalled that the function FN3 includes a loop at lines L21 and L22. For the sake of simplification, only the compilation of line 22 has been posted in Annex 7, at instruction IN83. It is notable that, in this instruction, the offset of the table element addressed does not appear as with a conventional compiler.

In particular, when the variable i has the value 7, integers (type INT) being coded in 2 bytes, a traditional compiler would give instructions to the processor, for selecting the $7^{th}$ element, to shift itself 14 bytes in the table, thus avoiding a known source of computer bugs.

Further, it is recalled that line L23 of the function FN3 called on the function FN2 declared in a library external to this application. In other words, within the meaning of the invention, the application AP2 is not in the context of the function FN2. Thus the function FN2 cannot include the field X, assigned to the application AP2 in its virtual address.

Consequently, the CODE part of the function FN3 includes instructions IN84 allowing the index of the application field of the function FN2 to be obtained; this index function can according to the present invention, be interpreted either by the MMU 12 or by the operating system of the computer system SINF.

In a particular embodiment of the invention, the function which executes GET_INDEX, to wit, the MMU or the operating system, can check that the application AP2 has sufficient rights to obtain the index of the application field of the function FN2.

It will be noted that the software entity VG2 particularly includes two virtual addresses, to wit, the virtual address Y.0.1 in the context of the function FN2 of the library LIBFN2 and the virtual address X.0.3 in the context of the function MAIN( ) of the application AP2.EXE.

Thanks to the MAP function, the instruction IN85 allows any access to virtual address Y.0.1 to be redirected to virtual address x.0.3.

The instruction IN86 is similar, for the "table" variable.

The instruction IN87 allows the function FN2 with virtual address Y.0 to be called.

The instructions IN88 and IN89 cancel the redirection performed in instructions IN85 and IN86.

Annex 8 gives the result of the compilation of the function MAIN( ) from the source file AP2.C.

Its HEADER part includes an instruction IN101 allowing an index to be dynamically assigned to the application field AP of the executable AP2.EXE. This index is denoted X. It is of the same kind as the index Y of the library LIBFN2.EXE.

The instruction IN102 allows the virtual address X.0 to be assigned to the CODE of the function MAIN( ).

The instructions IN103 through IN107 assign the addresses of global variables according to a mechanism already described.

It will be noted that in the exemplary embodiment described here, the global variables belong to the context of the function MAIN( ) so that the logical addresses of each of the global variables repeat the logical address X.0 assigned to the function The instruction IN108 allocates 1,000 bytes of memory for the CODE of the function MAIN( ) and the instruction IN109 loads this function MAIN( ) into memory. The CODE part includes five instructions IN110 through IN114 to assign a range of physical addresses of 1, 2 or 6 bytes to each of the variables RES, VG1, VG2, PWD and PWD_USER. The instructions IN115 and IN116 allow the variables VG1 and VG2, respectively, to be initialized with the values 11 and 5.

The instruction IN117 is the result of the compilation of line L7 of the function MAIN( ). It allows the access rights to the variable PWD to be defined. In the example described here, it must be interpreted as giving read only, or RO rights to the function with the logical address X.4 (lecture_PWD) and write-only rights to the function with the logical address X.3, to wit, the function (écriture_PWD).

The instruction IN118 is a call to the function FN1. During execution of line L16, the processor tries to write the value 220000 into the variable x of type integer (INT). This incompatibility is detected by the MMU 12 which generates an error signal. As a variation, it could have on the one hand modified the type associated with this variable, and other hand allocated a 32-bit address range (long size), thus dynamically avoiding a runtime error.

The instructions IN119 and IN120 are of the same type as the instruction IN85 and IN86 described previously with reference to Annex 7. They allow access to the parameters a and b of the function FN3 to be redirected toward the global variables VG1 and VG2 of the function MAIN( ).

The instruction IN121 calls on the function FN3 with logical address X.2.

The instructions IN122 and IN123 cancel the redirections performed in the instructions IN119 and IN120.

The instruction IN124 is an instruction allowing redirection of access to the parameters PWD_USER with logical address X.0.5 toward the global variable PWD_USER with logical address X.3.1.

The instruction IN125 is a call to the function écriture_PWD.

The instruction IN126 cancels the redirection of the instruction IN124.

The instructions IN127 through IN131 are of the same type as the function lecture_PWD. We will now explain how the execution of the application AP2.EXE proceeds.

Figure 4:
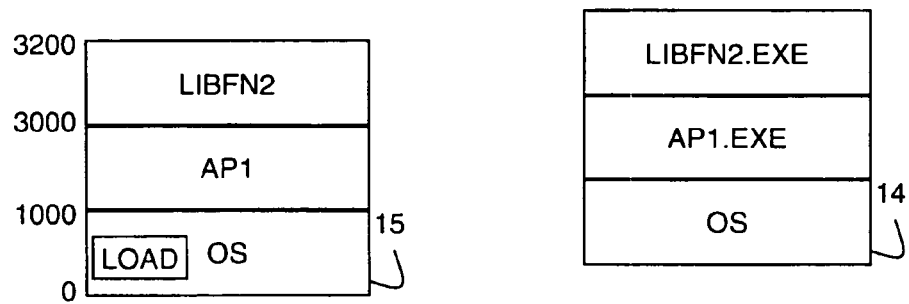
FIGS. 4, 6, 7 and 8 show the evolution of the computer system of FIG. 1 in a utilization example.

Referring to FIG. 4, we will describe the state of the computer system SINF prior to that execution.

We consider in this example that the operating system OS, the application AP1.EXE and the library LIBFN2.EXE are already loaded into the read-write memory 15.

In the example described here, the operating system OS includes a module LOAD allowing the codes in memory to be changed.

In the example described here, the OS, the application AP1.EXE and the library LIBFN2.EXE occupy the address ranges 0:1000, 1000:3000, 3000:3200 respectively.

The three executables and the operating system OS are found in the read-only memory 14.

The content of the memory 13 associated with the memory management unit MMU 12 is shown more precisely.

In the example described here, the logical addresses are managed in the form of tables, to wit, with a table by hierarchical level within the meaning of the mother-daughter logic previously described.

In other words, in the example described here, there is a table for applications, a table for functions and a table for variables. In the embodiment described here, the application fields AP of the operating system OS, of the application AP1.EXE and of the library LIBFN2.EXE are respectively the indexes 0, 1 and 2.

Consequently, in the embodiment described here, the memory 13 includes an application level table comprising three lines, each line comprising on the one hand the name of the application and on the other the index associated with that application. In the embodiment described here, each of these lines points possibly toward a lower level table in the mother-daughter hierarchy, to reference lower level logical addresses. This mechanism will be described precisely with reference to the figures that follow.

Figure 5:
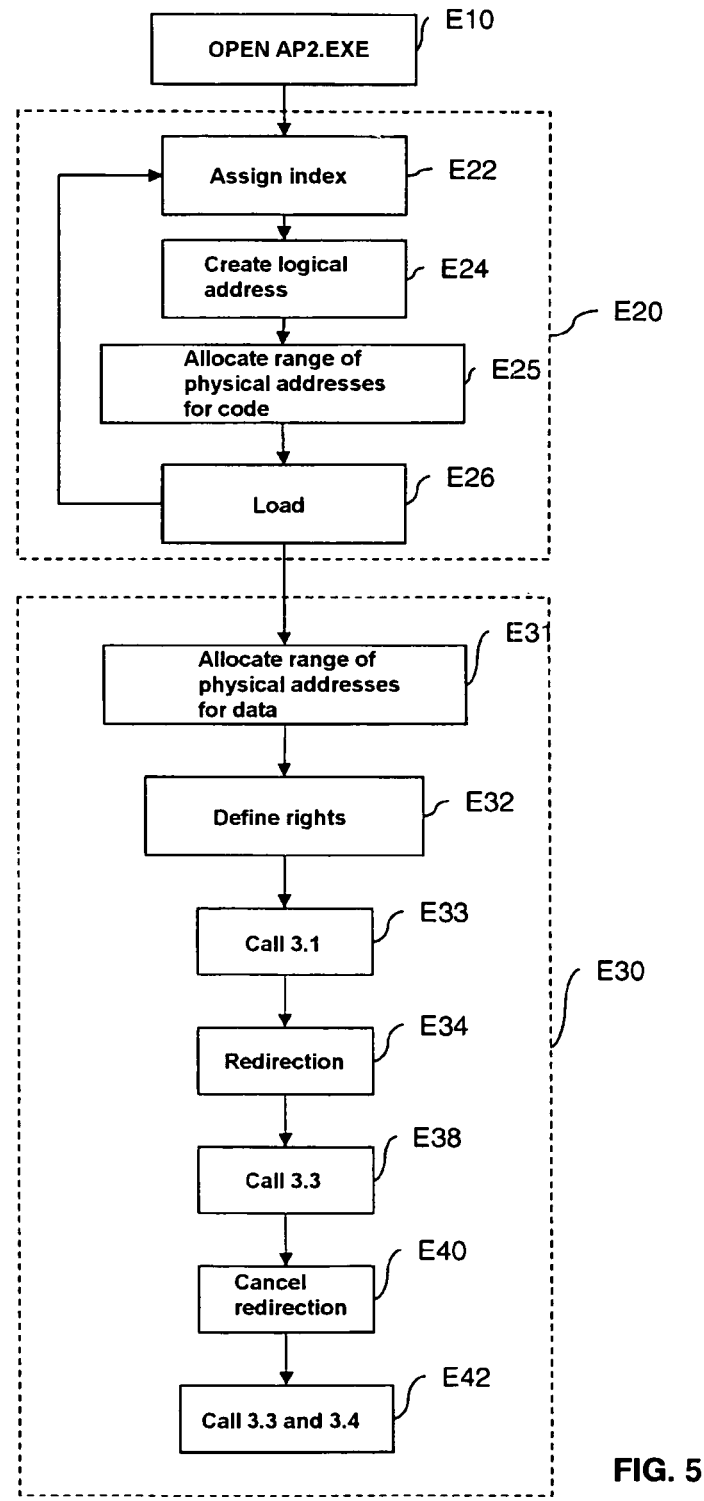
FIG. 5 shows in the form of an exemplary flowchart of the main [ . . . ] of a creation process and of a runtime process according to the invention.

Referring to FIG. 5, we will now describe a method in conformity with the invention for executing the executable program of Annex 8 obtained by compilation of the function MAIN( ) from the file AP2.C. We assume that this file AP2.EXE is opened during a step E10.

The processing of the file AP2.EXE comprises a first treatment, carried out by the LOAD module of the operating system OS, for processing the HEADER part of this file. This general step is labeled E20 in FIG. 5.

It will then comprise a general step E30, for executing the computer program AP2.EXE once it is loaded into memory.

We will first describe precisely the processing of the HEADER part. The general step E20 comprises, in the example described here, a first sub-step labeled E22, corresponding to the execution of instruction IN101, during which the index 3 is assigned to the application field of the executable AP2.EXE.

This value is selected by the MMU 12, after consulting the application table of the memory 13.

It is noted in fact, with reference to FIG. 4, that the indexes 0, 1, and 2 are already reserved. The MMU assigns a free index. It is of course understood that it is not essential to select a consecutive index. The only requirement being that this index is free.

This process then comprises a sub-step E24 for assigning logical addresses to the software entities descended from the application AP2.EXE.

In particular, execution of the instruction IN102 assigns the logical address 3.0 to the code of the function MAIN( ).

Then, each of the instructions IN103 through IN107 assigns a logical address to the daughters of the function MAIN( ).

Each of the logical address created during this sub-step E24 is posted in the data structure of the memory 13 of the MMU 12.

More precisely, a "function" level table FN is created to store the logical address of the function MAIN( ) and a "variable" level table VAR is created to store the logical addresses of the global variables of the function MAIN( ).

Figures 6, 8:
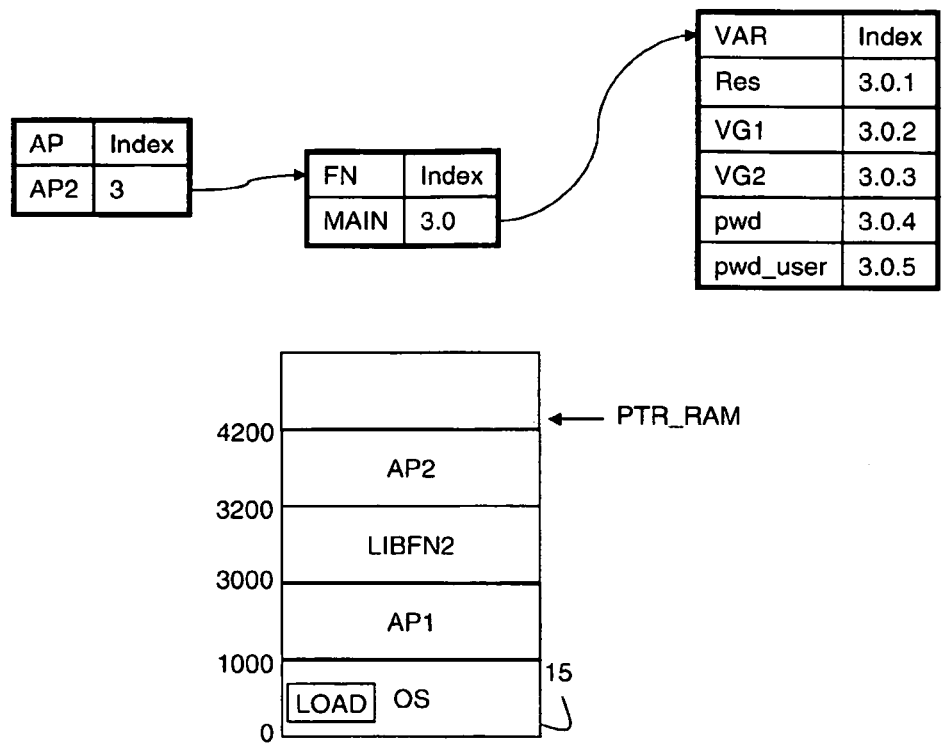

As shown in FIG. 6, which shows the state of the memory 13 after execution of the sub-step E24, the "application" level table points to the "function" level table FN which for its part points to the "variable" level table VAR.

This data structure of course allows a mother software entity to know the logical addresses of its descendant software entities, by following this chain of pointers.

It will be noted that it is not necessary, thanks to the invention, to provide a reverse chain, because any daughter software entity can, by consulting the first fields of its own logical address, know the logical addresses of each of its ancestors.

The sub-step E24 is followed by a sub-step E25 which allocates a range of addresses in memory to each of the software entities of the "function" level table FN. This sub-step corresponds to the execution of the instructions IN108 and IN109 to allocate 1,000 bytes of memory to the function MAIN( ) in the read-write memory 15.

The subs-step E25 is followed by the sub-step E26 during which the loading module LOAD loads the CODE part of the file AP2.EXE into this range of addresses.

The state of the read-write memory 15 after loading the application AP2 is shown in the same FIG. 6.

The general step E20 repeats in a loop, for all the HEADERs contained in the executable AP2.EXE, to wit, those described previously with reference to Annexes 3 through 8.

Figure 7:
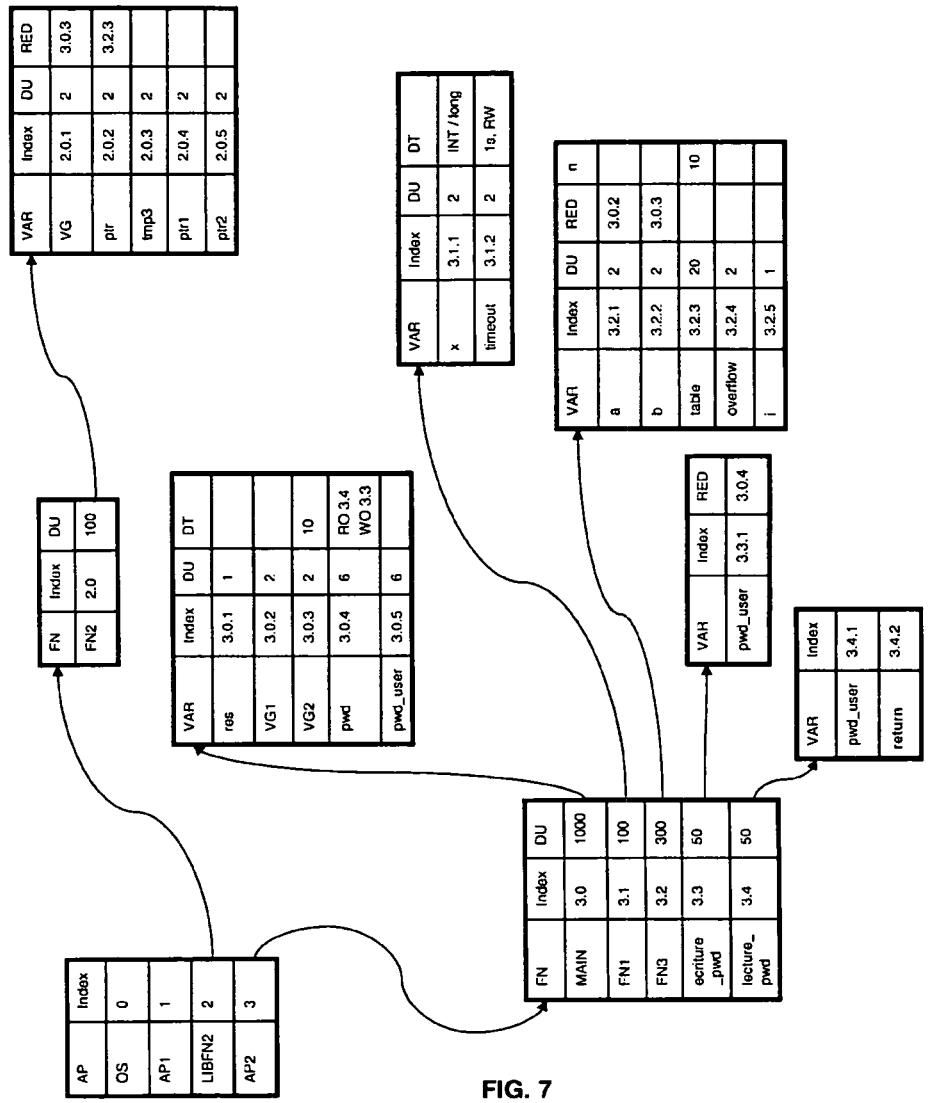

FIG. 7 shows the tree structure of the tables of the memory of the MMU after processing of all these HEADERs after the general step E20.

The application AP2.EXE having been loaded into the read-write memory 15, we will now describe the execution of this application by the processor 11.

This execution starts with a step E31 comprising the execution of the instruction IN110 of the CODE part of the file AP2.EXE. This instruction consists of allocating 1 byte to the variable RES with logical address 3.0.1 in the read-write memory 15.

In this implementation example, the range allocated to each of the variables is stored in the "variable" level table VAR managed by the MMU 12.

To this end, in the embodiment described here, the MMU 12 comprises a register wherein it stores a pointer PTR_RAM to the first free address in the read-write memory 15.

By way of example, the physical address ranges allocated to the different variables of the function MAIN( ) are posted in the data structure of FIG. 8.

In the example of FIG. 8, each range of addresses is identified by a starting address and a size DU.

As a variation, a starting address and an ending address could be provided, or a size and an ending address.

The instructions IN115 and IN116 correspond to the lines L4 and L5 of the function MAIN( ). For their execution, the processor searches, in the data structure, for the physical address associated with the logical addresses 3.0.2 and 3.0.3.

By way of examples, the logical address 3.0.2 corresponds t the variable 2 of the function MAIN( ) (field 0) of the application AP2 (index 3).

Step E31 is followed, in this example, by a step E32 including assigning rights, corresponding to the execution of the instruction IN117.

It is recalled that, in conformity with the programmer's selection, the variable PWD can be accessed for reading only by the function lecture_PWD and for writing only by the function écriture_PWD. This results, after execution of the instruction IN117, in rights stored in the data structure managed by the MMU 12.

More precisely, these rights are registered in a field DT associated with the logical address 3.0.4 associated with this variable.

This field DT is checked by the MMU 12 at each access to the software entity PWD with logical address 3.0.4. For the implementation of the invention, the MMU is informed by the processor of the software entities being executed and the variables being accessed.

As a variation, this check can be performed by the processor 11 inasmuch as it knows the rights stored in the memory 13 of the MMU 12.

The processor then calls, during a step E33, the function FN1, with logical address 3.1, in execution of the instruction IN118.

Then, during a step E34, the processor 11 executes the virtual address redirection instructions IN119 and IN120, as has already been described.

During this step, the MMU 12 registers the address redirection in the "variable" level table VAR as shown in FIG. 7.

Consequently, after this registration, any access to the variable with the virtual address 3.2.1 is redirected toward the variable VG1 with logical address 3.0.2.

It should be noted that, in conformity with the invention, different access rights can be specified for a single software entity depending on the context. In particular, the software entity with the virtual address 3.2.1 can be accessed with different access rights from those defined to access the same software entity with the address 3.0.2.

The runtime process conforming to the invention comprises, in this example, a step E38 for executing the function écriture_PWD, with virtual address 3.3.

In the implementation example described here, the process then comprises a step E40, during which the processor executes the instructions IN122 and IN123 for canceling the redirections performed in step E34.

It will be noted that the memory image given in FIG. 7 is the image of the memory before this cancellation step.

Of course, after execution of a software entity, the MMU 12 destroys the logical address of this software entity, of its daughter software entities and frees the ranges of memory allocated to these entities.

In the implementation example described here, the runtime process conforming to the invention ends with a step E42 during which it executes the instructions IN124 through IN131 corresponding to the calls to the functions écriture_PWD and lecture_PWD.

The mechanism is exactly the same as that implemented for the execution of the function FN3. In the embodiment described here, at least for some software entities, a type is associated with that software entity is associated with it in the tables of the memory 13 managed by the MMU 12.

In the example described here, the INT type in particular is associated with the variable X having virtual address 3.1.1 as shown in FIG. 7.

This advantageously allows the MMU 12 to check that any write access to this software entity is compatible with that software entity, whether as to type or as to size.

The MMU 12 thus detects the programming error of line L16.

ANNEX 1

AP1.C

| | | |
|---|---|---|
| L100 | → | int main ( ) { |
| L101 | → | ... } |

AP2.C

| | | |
|---|---|---|
| L1 | → | extern int fn2(short param, short *ptr) ; |
| L2 | → | int main ( ) { |
| L3 | → | short res ; |
| L4 | → | int VG1 = 11 ; |
| L5 | → | int VG2 = 5 ; |
| L6 | → | ... char pwd[6] ; char pwd_user[6] ; |
| L7 | → | # pwd : RO, lecture_pwd ; WO , écriture_pwd # |
| L8 | → | fn1 ( ) ; |
| L9 | → | fn3 (VG1, VG2) ; |
| L10 | → | écriture_pwd (pwd_user) ; |
| L11 | → | res = lecture_pwd (pwd_user) ; } |
| L12 | → | void fn1 ( ) { |
| L13 | → | int x = 11 ; |
| L131 | → | # TYPE = int # |
| L14 | → | int timeout = 20000 ; |
| L15 | → | #timeout : RO, 1s, 1$^{er}$ accès RW# |
| L16 | → | x = x * timeout ; } |
| L17 | → | void fn3 (int a, int b) { |
| L18 | → | int table[10] ; |
| L19 | → | ... int overflow ; |
| L20 | → | short i ; |
| L21 | → | for (i=0 ; i<a ; i++) { |
| L22 | → | table[i] = i ; } |
| L23 | → | fn2 (VG2, table) ; } |
| L24 | → | short lecture-pwd (char[6] pwd_user) { |

ANNEX 1 -continued

| | | |
|---|---|---|
| L25 | → | if (pwd_user == pwd) { |
| L26 | → | return OK ; |
| L27 | → | } else { |
| L28 | → | return NG ; } } |
| L29 | → | void écriture_pwd (char[6] pwf_user) { |
| L30 | → | pwd = pwd_user ; } |

LIBFN2.C

| | | |
|---|---|---|
| L31 | → | void fn2 (short VG, long *ptr) { |
| L32 | → | #MALLOC_MAx = 10# |
| L33 | → | int tmp3 |
| L34 | → | int *ptr1=malloc (VG) ; |
| L35 | → | int *ptr2=malloc (VG) ; |
| L36 | → | free (ptr1) ; |
| L37 | → | *ptr = 1000000 ; } |

ANNEX 2 short ATTRIB_IDX_DYN (short prof, nom) {
 ; returns an index for the depth prof of the entity nom
}
short ATTRIB_IDX_STAT (adresse_logique) {
 ; assigns a logical address
 ; returns OK, NG in the event of failure
}
void MAP(adresse_logique1, adresse_logique2) {
 ; redirects access to adresse_logique1 toward adresse_logique2
}
void UNMAP(adresse_logique1, adresse_logique2) {
 ; cancels redirection
}
int ATTRIB_MEM (adresse_logique, taille) {
 ; allocates taille bytes for adresse_logique in physical memory;
}
int ATTRIB_MEM_EXEC (adresse_logique, taille) {
 ; allocates taille bytes for adresse_logique in physical memory;
}
MALLOC_MAX(size) {
 ; defines the maximum size of the physical memory that can be allocated by a software entity;
}
ATTRIB_DROITS (software entity, rights) {
 ; allocates rights to a software entity
GET_INDEX (AP, FN, ..., software entity) {
 ; returns one or more indexes of the fields of a software entity.
}

ANNEX 3
LIBFN2.EXE

HEADER

| | | |
|---|---|---|
| IN31 | → | Y=ATTRIB_IDX_DYN (AP, libfn2) ; |
| IN32 | → | ATTRIB_IDX_STAT(Y.0) ; /* virtual_address of fn2( ) */ |
| IN33 | → | ATTRIB_IDX_STAT(Y.0.1) ; /* virtual_address of VG */ |
| IN34 | → | ATTRIB_IDX_STAT(Y.0.2) ; /* virtual_address of ptr */ |
| IN35 | → | ATTRIB_IDX_STAT(Y.0.3) ; /* virtual_address of tmp3 */ |
| IN36 | → | ATTRIB_IDX_STAT(Y.0.4) ; /* virtual_address of ptr1 */ |
| IN37 | → | ATTRIB_IDX_STAT(Y.0.5) ; /* virtual_address of ptr2 */ |
| IN38 | → | ATTRIB_MEM (Y.0, 100) ; /* allocates 100 bytes for fn2 ( ) */ |
| IN39 | → | LOAD Y.0 |

CODE

| | | |
|---|---|---|
| IN50 | → | MALLOC_MAX(10) |
| IN40 | → | ATTRIB_MEM-EXEC (Y.0.3, 2) |
| IN41 | → | ATTRIB_MEM-EXEC (Y.0.4, Y.0.1) |
| IN42 | → | ATTRIB_MEM-EXEC (Y.0.5, Y.0.1) |
| IN43 | → | FREE_MEM (Y.0.4) |
| IN44 | → | *(Y.0.2) = 1000 |

ANNEX 4
AP2.EXE /* compilation of fn1( ) */

HEADER

| | |
|---|---|
| IN60 | → ATTRIB_IDX_STAT (X.1) ; /* virtual_address of fn1 */ |
| IN61 | → ATTRIB_IDX_STAT(X.1.1) ; /* virtual_address of x */ |
| IN62 | → ATTRIB_IDX_STAT(X.1.2) ; /* virtual_address of timeout */ |
| IN63 | → ATTRIB_MEM(X.1, 100) ; /* allocates 100 bytes for fn1 */ |
| IN64 | → LOAD X.1 |

CODE

| | |
|---|---|
| IN65 | → ATTRIB_MEM-EXEC (X.1.1, 2) |
| IN651 | → ATTRIB_DROITS(X.1.1, INT) |
| IN66 | → ATTRIB_MEM-EXEC (X.1.2, 2) |
| IN67 | → ATTRIB_DROITS(X.1.2, TIMEOUT=1s ; start=1$^{er}$ accès RW) |
| IN68 | → X.1.2 = 20000 |
| IN69 | → X.1.1 = X.1.1 * X.1.2 |

ANNEX 5
ap2.exe /* compilation of lecture_pwd( ) */

HEADER

| | |
|---|---|
| IN70 | → ATTRIB_IDX_STAT (X.4) ; /* virtual_address lecture_pwd */ |
| IN71 | → ATTRIB_IDX_STAT(X.4.1) ; /* virtual_address pwd_user */ |
| IN72 | → ATTRIB_IDX_STAT(X.4.2) ; /* virtual_address return */ |
| IN73 | → ATTRIB_MEM(X.4, 50) ; /*allocates 50 bytes for lecture_pwd*/ |
| IN74 | → LOAD X.4 |

CODE

| | |
|---|---|
| IN75 | → COMPARE X.4.1, X.0.4 |
| IN76 | → ... |

ANNEX 6
ap2.exe /* compilation of écriture_pwd( ) */

HEADER

ATTRIB_IDX_STAT (X.3) ; /* virtual_address écriture_pwd */
ATTRIB_IDX_STAT(X.3.1) ; /* virtual_address pwd_user */
ATTRIB_MEM(X.3, 50) ; /*allocates 50 bytes for écriture_pwd*/
LOAD X.3

CODE

X.0.4 = X.3.1

ANNEX 7
ap2.exe /* compilation of fn3( ) */

HEADER

ATTRIB_IDX_STAT (X.2) ; /* virtual_address fn3 */
ATTRIB_IDX_STAT(X.2.1) ; /* virtual_address a*/
ATTRIB_IDX_STAT(X.2.2) ; /* virtual_address b*/
ATTRIB_IDX_STAT(X.2.3) ; /* virtual address of table */
ATTRIB_IDX_STAT(X.2.4) ; /* virtual address of overflow*/
ATTRIB_IDX_STAT(X.2.5) ; /* i */
ATTRIB_MEM(X.2, 300) ; /*allocates 300 bytes for fn3*/
LOAD X.2

CODE

| | |
|---|---|
| IN80 | → ATTRIB_MEM_EXEC(X.2.3, 1, 10) |
| IN81 | → ATTRIB_MEM_EXEC(X.2.4, 2) |
| IN82 | → ATTRIB_MEM_EXEC(X.2.5, 1) |
| IN83 | → X.2.3[(X.2.5)] = X.2.5 |

ANNEX 7
ap2.exe /* compilation of fn3( ) */

| | |
|---|---|
| IN84 | → Y = GET_INDEX (AP, FN, fn2) |
| IN85 | → MAP (Y.0.1 ; X.0.3) |
| IN86 | → MAP (Y.0.2, X.2.3) |
| IN87 | → CALL Y.0 |
| IN88 | → UNMAP (Y.0.1 ; X.0.3) |
| IN89 | → UNMAP (Y.0.1 ; X.0.3) |

ANNEX 8
ap2.exe /* compilation of main3( ) */

HEADER

| | |
|---|---|
| IN101 | → X = ATTRIB_IDX_DYN (AP, main) |
| IN102 | → ATTRIB_IDX_STAT (X.0) ; /* virtual_address of main */ |
| IN103 | → ATTRIB_IDX_STAT(X.0.1) ; /* virtual_address res*/ |
| IN104 | → ATTRIB_IDX_STAT(X.0.2) ; /* virtual_address VG1*/ |
| IN105 | → ATTRIB_IDX_STAT(X.0.3) ; /* virtual_address VG2 */ |
| IN106 | → ATTRIB_IDX_STAT(X.0.4) ; /* pwd*/ |
| IN107 | → ATTRIB_IDX_STAT(X.0.5) ; /* pwd_user */ |
| IN108 | → ATTRIB_MEM(X.0, 1000) ; /*allocates 1000 bytes for main*/ |
| IN109 | → LOAD X.0 |

CODE

| | |
|---|---|
| IN110 | → ATTRIB_MEM_EXEC (X.0.1, 1) |
| IN111 | → ATTRIB_MEM_EXEC (X.0.1, 2) |
| IN112 | → ATTRIB_MEM_EXEC (X.0.1, 2) |
| IN113 | → ATTRIB_MEM_EXEC (X.0.1, 6) |
| IN114 | → ATTRIB_MEM_EXEC (X.0.1, 6) |
| IN115 | → X.0.2 = 11 |
| IN116 | → X.0.3 = 5 |
| IN117 | → ATTRIB_DROITS(X.0.4 ; RO:X.4 ; WO : X.3) |
| IN118 | → CALL X.1 |
| IN119 | → MAP (X.2.1, X.0.2) |
| IN120 | → MAP (X.2.2, X.0.3) |
| IN121 | → CALL X.2 |
| IN122 | → UNMAP (X.2.1, X.0.2) |
| IN123 | → UNMAP (X.2.2, X.0.3) |
| IN124 | → MAP (X.3.1, X.0.5) |
| IN125 | → CALL X.3 |
| IN126 | → UNMAP (X.3.1, X.0.5) |
| IN127 | → MAP (X.4.1, X.0.5) |
| IN128 | → MAP (X.4.2, X.0.1) |
| IN129 | → X.0.1 = CALL X.4 |
| IN130 | → UNMAP (X.4.1, X.0.5) |
| IN131 | → UNMAP (X.4.2, X.0.1) |

The invention claimed is:

1. A virtual address creating process comprising:
creating a virtual address for a software entity called a "daughter" belonging to a context of a software entity called a "mother", said context identifying a hierarchical relationship of said daughter software entity with said mother software entity,
said virtual address comprising a series of fields allowing a retrieval of a series of fields of a virtual address of the mother software entity and a field unique in a context of the mother software entity,
each series of fields being associated with a single software entity which the series of fields defines completely.

2. A virtual address creation process according to claim 1, wherein rights of a first software entity to access a second software entity are determined by comparing at least one field of the logical address of the first software entity with at least one field of the logical address of the second software entity.

3. A virtual address creation process according to claim 1, further comprising assigning, to a daughter software entity belonging to a context of at least two mother software entities, a virtual address to said daughter software entity for each of said contexts.

4. A virtual address creation process according to claim 1, a virtual address comprising at least one supplementary datum specifying fields that are identical to those of a virtual address of a reference software entity.

5. A virtual address creation process according to claim 1, wherein information placing a time limit on access to the software entity is associated with the logical address of a software entity.

6. A virtual address creation process according to claim 1, wherein said series of fields in said virtual address permits an isolation in a memory of a thread from other threads of a same father process, permits different access rights at a software entity level, and permits different application groups to be isolated and compartmentalized in said memory.

7. A process for executing a computer program, said process comprising:
allocating a range of addresses in a physical memory of a computer system to be associated with a virtual address of a software entity, the virtual address including a field that is unique in a context, a series of fields allowing a retrieval of a series of fields of a virtual address of a mother software entity defining said context, said context indicative of a hierarchical inheritance by any software entities that hierarchically descend from said mother software entity,
each series of fields being associated with a single software entity which the series of fields defines completely.

8. A process for executing a computer program according to claim 7, wherein, should a software entity is shifted in memory, the entity is still defined by a same logical address before and after shifting.

9. A process for executing a computer program according to claim 7, wherein the memory of the computer system is dynamically divided into at least two parts, the software entities used by the computer system being shifted so as to group them in a first part of the memory while a second part of the memory is temporarily unused.

10. A process according to claim 9, further including managing a power supply of an unused part of the memory.

11. A process for executing a computer program according to claim 7, wherein a type of a software entity associated with a logical address of said single software entity and a memory size of said software entity associated with the logical address of said single software entity are dynamically modified.

12. A process for executing a computer program according to claim 7, a maximum quantity of memory that can be allocated to the software entity being associated with a logical address of a software entity, and wherein during each allocation of memory to this software entity a check is made to ensure that the maximum quantity is not exceeded.

13. A process for executing a computer program according to claim 7, further including, when access is gained to the software entity, advance loading into a cache memory of only a content from at least part of the range of addresses allocated to said software entity.

14. A process for executing a computer program according to claim 7, further including, when a software entity ceases to be executed, advance unloading of a content in cache memory of said software entity and of its daughter entities.

15. A code generating tool including:
a set of instructions, as tangibly embodied in a non-transitory storage medium for execution by a processor on a computer, for a compiler to create a virtual address for a software entity called a "daughter" belonging to a context of a software entity called a "mother,"
said virtual address comprising a series of fields allowing a retrieval of a series of fields of a virtual address of the mother software entity and a field unique in a context of the mother software entity, said context indicative of a hierarchical inheritance from said mother software entity to said daughter software entity,
each series of fields being associated with a single software entity which the series of fields defines completely.

16. A computer system comprising:
at least one processor; and
a physical memory,
wherein said at least one processor executes a series of instructions for allocating a range of addresses in the physical memory of said computer system as associated with a virtual address of a software entity, the virtual address comprising a field unique in a context and a series of fields allowing a retrieval of a series of fields of a virtual address of a mother software entity defining said context, wherein said software entity is related as hierarchically descending from said mother software entity, and said context indicates such hierarchical relationship,
each series of fields being associated with a single software entity which the series of fields defines completely.

17. The virtual address creating process according to claim 1, as tangibly embodied in a series of computer-readable instructions on a non-transitory storage medium.

18. The virtual address creating process according to claim 17, wherein said non-transitory storage medium comprises one of:
a memory device on a computer, as storing instructions currently being executed by said computer; a memory device on said computer, as storing instructions selectively executable by said computer;
a memory device on a remote server selectively accessible by said computer; and
a standalone storage medium intended to be inserted into an input device of said computer, for loading said computer-readable instructions onto a memory device of said computer.

19. The process for executing a computer program according to claim 7, as tangibly embodied in a series of computer-readable instructions on a non-transitory storage medium.

20. The process for executing a computer program according to claim 19, wherein said non-transitory storage medium comprises one of:
a memory device on a computer, as storing instructions currently being executed by said computer;
a memory device on said computer, as storing instructions selectively executable by said computer;
a memory device on a remote server selectively accessible by said computer; and
a standalone storage medium intended to be inserted into an input device of said computer, for loading said computer-readable instructions onto a memory device of said computer.

* * * * *